(12) United States Patent
Arel et al.

(10) Patent No.: US 10,055,685 B1
(45) Date of Patent: Aug. 21, 2018

(54) MACHINE LEARNING ARCHITECTURE FOR LIFELONG LEARNING

(71) Applicant: Apprente, Inc., Palo Alto, CA (US)

(72) Inventors: Itamar Arel, Los Altos, CA (US); Joshua Benjamin Looks, Palo Alto, CA (US)

(73) Assignee: Apprente, Inc., Palo Alto, CA (US)

( * ) Notice: Subject to any disclaimer, the term of this patent is extended or adjusted under 35 U.S.C. 154(b) by 0 days.

(21) Appl. No.: 15/785,270

(22) Filed: Oct. 16, 2017

(51) Int. Cl.
*G06N 3/08* (2006.01)
*G06N 3/04* (2006.01)

(52) U.S. Cl.
CPC .............. *G06N 3/08* (2013.01); *G06N 3/0427* (2013.01)

(58) Field of Classification Search
None
See application file for complete search history.

(56) References Cited

U.S. PATENT DOCUMENTS

| | | | |
|---|---|---|---|
| 2003/0149676 A1* | 8/2003 | Kasabov | G06N 3/0436 706/2 |
| 2013/0325862 A1* | 12/2013 | Black | G06F 17/30598 707/737 |
| 2017/0213150 A1 | 7/2017 | Arel et al. | |

OTHER PUBLICATIONS

Goodrich, Benjamin Frederick, "Neuron Clustering for Mitigating Catastrophic Forgetting in Supervised and Reinforcement Learning." PhD diss., University of Tennessee, 2015. http://trace.tennessee.edu/utk_graddiss/3581 (Year: 2015).*
Goodrich et al., Neuron Clustering for Mitigating Catastrophic Forgetting in Feedforward Neural Networks, IEEE, 2014, 7 pages (Year: 2014).*
Albesano et al., Adaptation of Artificial Neural Networks Avoiding Catastrophic Forgetting, IEEE, 2006, pp. 1554-1561 (Year: 2006).*
Markou et al., Noveltydetection: a review—part 2: neural network based approaches, Elsevier Signal Processing, 2003, 23 pages (Year: 2003).*
Kirkpatrick, J., et al. "Overcoming catastrophic forgetting in neural networks," Proceedings of the National Academy of Sciences, Mar. 28, 2017, pp. 3521-3526, vol. 114, No. 13.

* cited by examiner

*Primary Examiner* — Alan Chen
(74) *Attorney, Agent, or Firm* — Lowenstein Sandler LLP

(57) ABSTRACT

Some embodiments described herein cover a machine learning architecture with a separated perception subsystem and application subsystem. These subsystems can be co-trained. In one example embodiment, a data item is received and information from the data item is processed by a first node to generate a first feature vector comprising a plurality of features, each of the plurality of features having a similarity value representing a similarity to one of a plurality of centroids. The first node selects a subset of the features from the first feature vector, the subset containing one or more features that have highest similarity values. The first node generates a second feature vector from the first feature vector by replacing similarity values of features in the first feature vector that are not in the subset with zeros. A second node then processes the second feature vector to determine an output.

24 Claims, 8 Drawing Sheets

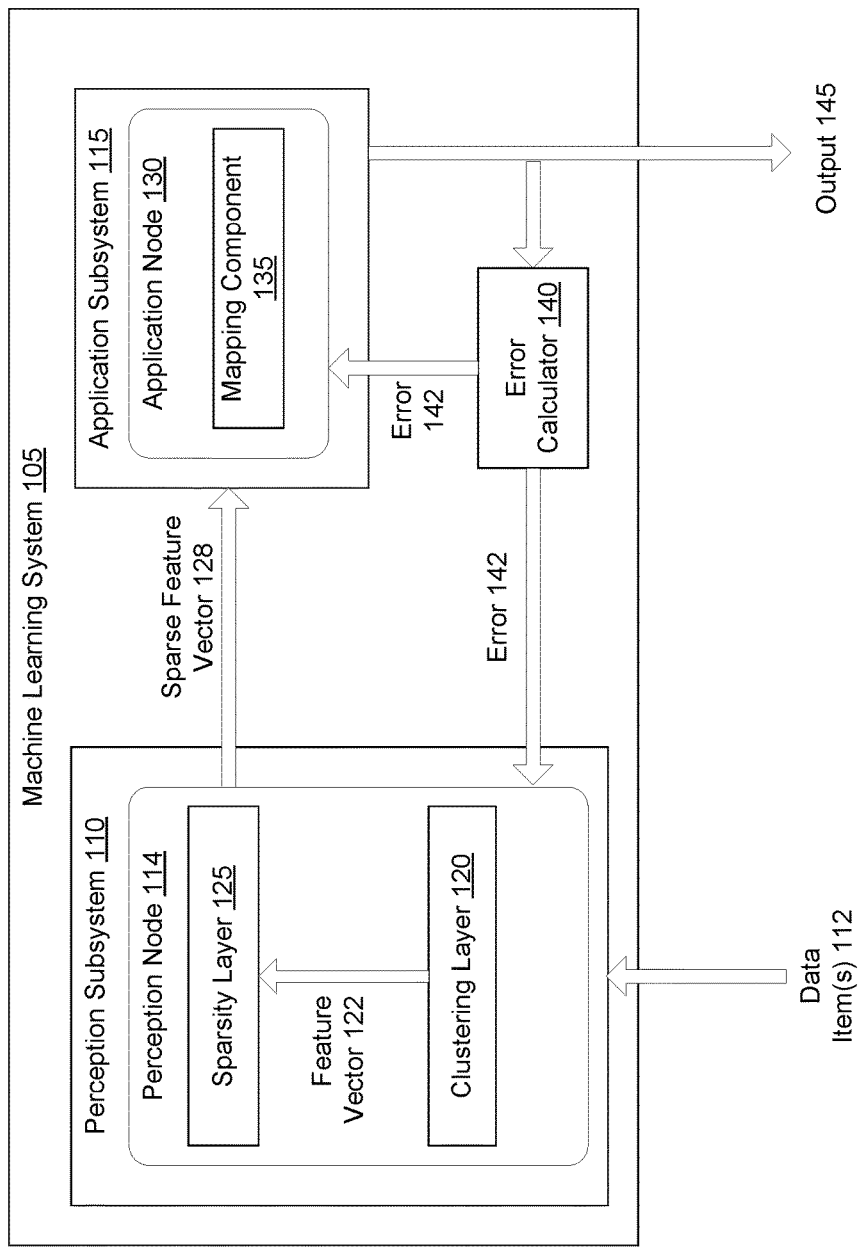

Allocation 210
- Allocate new centroid 235
- Produce inference (sparse feature vector) 240

Pure Inference 220
- Produce inference (sparse feature vector) 240
- Do not update centroids 230

Pure Inference 220
- Produce inference (sparse feature vector) 240
- Do not update centroids 230

Refinement 215
- Update winning centroid(s) 245
- Produce inference (sparse feature vector) 240

RELEVANCE: LOW / HIGH
NOVELTY: HIGH / LOW

MACHINE LEARNING ARCHITECTURE FOR LIFELONG LEARNING

TECHNICAL FIELD

This disclosure relates to the field of artificial intelligence and machine learning, and in particular to a machine learning system capable of lifelong learning.

BACKGROUND

Contemporary machine learning paradigms, such as most deep learning architectures and their governing supervised learning algorithms, consist of a single system that includes a feature representation component with a classifier or regression layers that map features to a desired output space. A convolutional neural network (CNN), for example, hosts multiple layers of convolutional filters, pooling and non-linearities in its lower layers, on top of which a multi-layer perceptron is commonly appended, mapping the top layer features extracted by the convolutional layers to decisions (e.g. classification outputs). Training is achieved in a supervised learning manner, which involves feeding a training dataset consisting of labeled inputs through the network, observing its outputs, defining an error (by measuring the difference between the outputs and the label values), and using techniques such as deep gradient descent and back-propagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved only if a sufficiently large and diverse training dataset is made available. In the absence of sufficient number of labeled examples in the training dataset, or lack of diverse examples, the network accuracy often degrades below a desired level of performance.

There are several key limitations to supervised learning, particularly when applied to large parametric models (such as contemporary deep learning architectures). The first is commonly referred to as catastrophic forgetting—a problem that affects artificial neural networks as well as many other supervised learning systems. When trained with novel patterns, neural networks tend to quickly unlearn prior representations and their mapping to outputs. Traditionally, neural network training is structured in a way that helps mitigate this effect. When learning in stationary settings, training data is generally shuffled and presented in a random order. The data presentation is stationary in that samples are drawn in an independent and identically distributed manner. If the data is presented in a manner that is non-stationary, the network may not be able to capture and retain representations that are presented at different time intervals. Traditionally, dynamic environments (environments in which labels change and/or new labels are added) have been recognized as tasks that are challenging for neural networks. If the task or environment changes (e.g., new labels are added), a neural network tends to catastrophically forget the previously learned task or environment setting (how to classify inputs using the original labels), as it learns how to classify inputs using the new labels. In other words, the network weights (parameters) of a machine learning system tune to accommodate the recent statistics of the input data, thereby "forgetting" prior representations.

Catastrophic forgetting renders lifelong learning unachievable for conventional machine learning architectures. Accordingly, to date machine learning systems have been unable to progressively learn new representations while not unlearning prior ones in a principled scalable manner.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 1A is a block diagram illustrating an architecture for a machine learning system, in accordance with embodiments of the present disclosure.

FIG. 2 is a block diagram illustrating a node update paradigm for a machine learning architecture, in accordance with embodiments of the present disclosure.

DETAILED DESCRIPTION

Figure 1B:
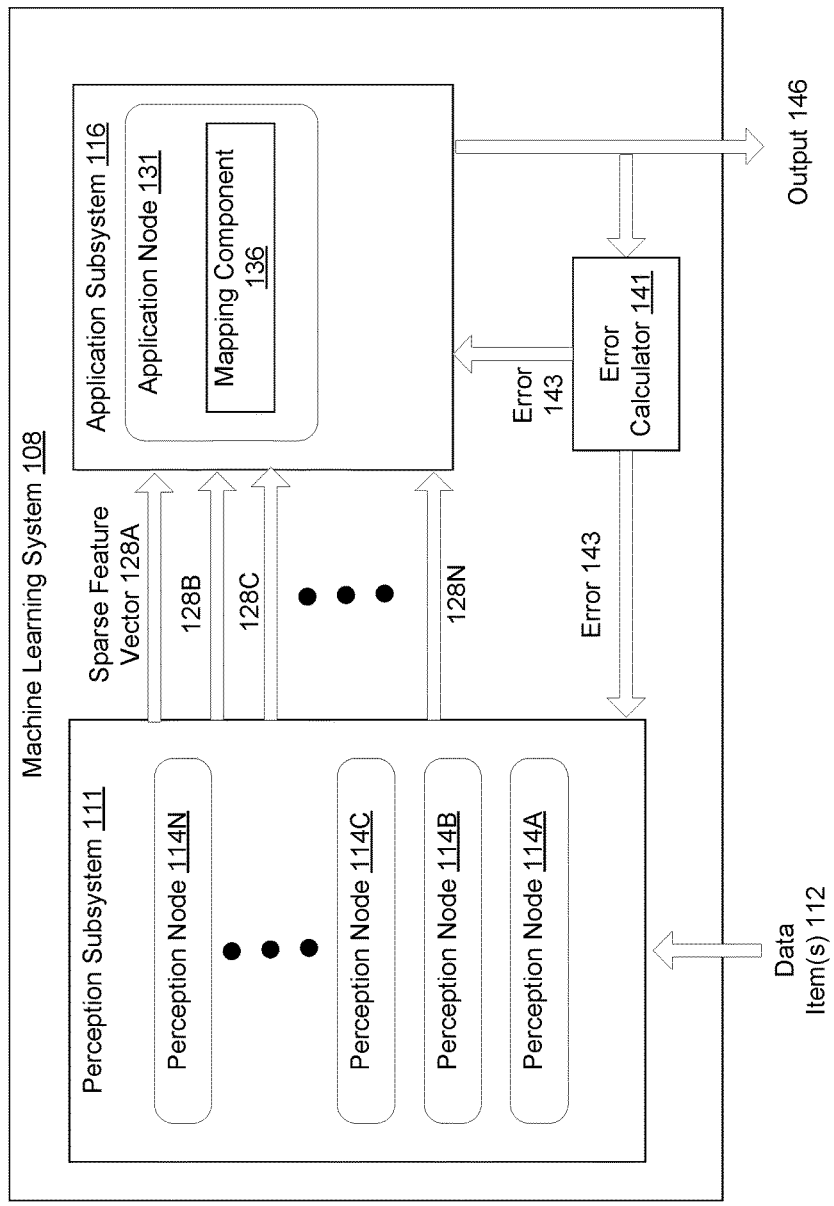
FIG. 1B is a block diagram illustrating an architecture for a machine learning system, in accordance with embodiments of the present disclosure.

Embodiments of the present disclosure relate to a new machine learning architecture capable of achieving one or more of lifelong learning, efficient learning, semi-supervised learning and localized learning.

Lifelong learning refers to the ability of a machine learning system to continue to learn new outputs, and construct new internal representations, without forgetting previously learned outputs. In traditional machine learning architectures, such as artificial neural networks, a neural network may be trained using a training dataset to generate a fixed number of outputs (e.g., to classify input images as belonging to a fixed number of classes). However, in order to train the neural network to generate a new output (e.g., to classify a new type of image), the training process generally needs to be redone using the entire original training dataset plus new data items associated with the new output. Failure to restart the training process for traditional machine learning systems generally results in catastrophic forgetting, in which the accuracy associated with previously trained outputs drops precipitously. Embodiments describe a machine learning architecture that is capable of achieving lifelong learning (learning progressively), thereby mitigating the effects of catastrophic forgetting. As a result, machine learning architectures described herein are capable of learning to produce new outputs with high accuracy without forgetting how to produce previously learned outputs and without degrading the accuracy associated with such previously learned outputs.

In an example of catastrophic forgetting associated with traditional machine learning architectures, a neural network may be trained to classify images as containing a dog or a cat. After training the neural network using a training dataset that contains labeled images of dogs and cats, the neural network is able to classify new images as containing dogs and cats with high accuracy. If a new labeled dataset of horses and fish is introduced and used to further train the neural network, that neural network will learn to classify horses and fishes, but will forget how to classify dogs and cats, thus resulting in catastrophic forgetting. In particular, the weights or properties of each node in the neural network are adjusted during the initial training to enable the neural network to identify dogs and cats. However, those weights are all changed during the further training to teach the neural network to identify horses and fishes. The changed weights essentially erase the earlier training for identifying dogs and cats. Embodiments described herein mitigate the problem of catastrophic forgetting by using techniques such as localized learning, the ability to add new representational resources (e.g., centroids) within nodes to capture new patterns in input data items, the use of a two part machine learning system that includes a perception subsystem and an application subsystem, and the use of both novelty criteria and relevancy criteria for determining when to update centroids in nodes.

Localized learning refers to the ability of one or more nodes in a machine learning system to independently determine whether they should be updated and in what manner. In traditional machine learning architectures, training is achieved by computing an output by the machine learning system for an input data item and then comparing the output to a known target associated with the input data item. The difference between the known target and the determined output is then used to determine an error, and the error is used along with a global loss function gradient and backpropagation to update all of the nodes in the machine learning system. Accordingly, traditional machine learning models (e.g., neural networks) apply globalized learning. In contrast, embodiments use one or more of sparse vectors and distinct learning rules associated with each node to achieve localized learning. In embodiments an error or other relevancy rating is broadcast to multiple nodes, and each node makes its own determination as to whether to update. Localized learning facilitates lifelong learning and efficient learning in embodiments.

Traditional machine learning architectures learn through a process called supervised learning. In supervised learning, every data item in the training dataset has an associated target value. The target value for each data item is then used to compute an error, and the error is used to train the machine learning model. Semi-supervised learning refers to a learning process for machine learning models in which only a portion (e.g., a small portion such as 5-10%) of the data items used to train the machine learning model include targets. Embodiments of the present invention achieve semi-supervised learning by using techniques such as localized learning of nodes, the ability to add new resources (e.g., centroids) within nodes to identify new patterns in input data items, the use of a two part machine learning system that includes a perception subsystem and an application subsystem, and the use of both novelty criteria and relevancy criteria for determining when to update weights of centroids in nodes.

In one embodiment, a machine learning system executing on a processing device receives a data item. A first node of the machine learning system processes information from at least a portion of the data item to generate a sparse feature vector, wherein a majority of feature elements in the sparse feature vector have a value of zero. The first node sends the sparse feature vector to a second node of the machine learning system, which processes the sparse feature vector to determine an output. The machine learning system determines a relevancy rating associated with the output. The machine learning system provides the relevancy rating to the first node. The first node then determines whether to update based on update criteria associated with the first node, wherein the update criteria comprise a relevancy criterion and a novelty criterion. The machine learning system further provides the relevancy rating to the second node, which updates based on the relevancy rating. If the data item included a target, then an error may be determined based on a function of the generated output and the target, and the error is used as the relevancy rating. If the data item does not include a target, then a confidence may be computed for the output, and the confidence may be used as the relevancy rating.

In one embodiment, a machine learning system executing on a processing device receives a data item. The machine learning system may include a perception subsystem and an application subsystem. A first node of the perception system that comprises a plurality of centroids processes information from at least a portion of the data item to generate a first feature vector. The first feature vector comprises a plurality of feature elements, where each of the plurality of feature elements have a similarity value representing a similarity to one of the plurality of centroids. The first node selects a subset of the plurality of feature elements from the first feature vector, the subset containing one or more feature elements of the plurality of feature elements that have highest similarity values. The first node generates a second feature vector from the first feature vector by replacing similarity values of feature elements in the first feature vector that are not in the subset with zeros. The first node provides the second feature vector to a second node of the application subsystem, which processes the second feature vector to determine an output.

The machine learning system may additionally determine a relevancy rating for the data item, which may be used to determine whether to update the first node and/or the second node. The relevancy rating may be based on an error and/or a confidence measure associated with an output produced by the second node. Additionally, the first node may determine a novelty rating associated with the data item, and may determine whether to update based on the relevancy rating and the novelty rating. The novelty rating may be based on similarity values of the feature elements in the first feature vector.

Referring now to the figures, FIG. 1A is a block diagram illustrating an architecture for a machine learning system 105, in accordance with embodiments of the present disclosure. The machine learning system 105 comprises two complementing subsystems: a perception subsystem 110 that contains a perception node 114 and an application subsystem 115 that contains an application node 130. The role of the perception node 114 in the perception subsystem 110 is to receive streams of multi-dimensional sensory inputs (e.g., data items 112), which may originate from one or more modalities, and form representations (e.g., feature vectors) that capture the salient attributes of said inputs such that the application node 130 can receive said representations as inputs and map those to desired outputs. Without loss of generality, the application node output can be in the form of classification decisions, predicted values or actions to be applied to an environment with which the machine learning system 105 interacts.

In one embodiment, the perception subsystem 110 receives an input data item 112. The data item is input into a perception node 114 of the perception subsystem 110. A clustering layer 120 of the perception node 114 processes the data item 112 to generate a feature vector 122, which may be viewed as a representation of the data item 120. A sparsity layer 125 of the perception node 114 then processes the feature vector 122 to generate a sparse feature vector 128. In one embodiment, the sparsity layer 125 selects one or more feature element (also referred to as an index) of the feature vector 122 having a highest value, and replaces the values of all unselected feature elements (indexes) with zeros to generate the sparse feature vector 128. In one embodiment, the value of the selected feature element is compared to a threshold. If the value of the selected feature element (or feature elements) is lower than the threshold, then the value of the selected feature element(s) may also be replaced with zeros. In this instance, the sparse feature vector 128 contains only zeros and is referred to herein as a null inference. In an alternative embodiment, the sparse feature vector 128 is not generated, and the feature vector 122 is instead passed to the application subsystem 115.

The sparse feature vector 128 (or feature vector 122) is provided to the application subsystem 115 and is input into an application node 130 of the application subsystem 115. The application node 130 includes a mapping component 135 that maps the sparse feature vector 128 into an output space of possible outputs to generate an output 145. In embodiments the output space is not fixed, and at any time the output space of possible outputs may expand to include new possible outputs. In one embodiment, the output 145 comprises a score or probability for each possible output in the output space. The possible output with the highest score or probability may be selected.

The application subsystem 115 may be trained to perform numerous different types of activities (e.g., to produce numerous different types of outputs). Some example application subsystems 115 include a classifier, a predictor, and a controller. A classifier learns to classify input data items as belonging to a particular class from among a group of possible classes. For example, an image classifier might classify an input data item as a dog, a cat, a horse, a person, a car, and so on. Notably, in embodiments the number of classes that a classifier can distinguish between is not fixed, and the classifier can continually learn to classify new types of inputs as belonging to new classes without forgetting previous classifications.

A predictor attempts to predict a next value (e.g., a next data item) based on an input data item. A predictor may learn to predict a particular outcome based on a given set of observations. Examples of predictors are predictors that predict next words in a sentence based on previous words, predictors that predict next frames in a video based on previous frames, predictors that predict next stock values based on previous stock values and other data, and so on. Notably, in embodiments the number of different predictions that may be output can grow over time.

A controller may learn to issue actions that will impact an environment based on input data items. In an example, an controller may be used to determine when an automated (self-driving) car should speed up, slow down, turn, and so on.

In some instances the data item 112 may include a target that identifies a correct output associated with the data item 112. If the data item 112 included a target, then the output 145 may be compared to the target at error calculation component 140 to generate an error, as is discussed in greater detail below. The error 142 may be sent to the application node 130 to update the application node (e.g., to update weights in the application node associated with one or more feature elements or indexes) and to the perception node 114 to update the perception node 114. The update mechanisms for the perception node 114 and the application node 130 may differ, as is set forth in greater detail below. In one embodiment, the error 142 is broadcast to all nodes 114, 130, and each node makes its own determination as to whether that node should be updated.

An embodiment is shown in FIG. 1A that includes only a single perception node 114 and a single application node 130. However, it should be understood that in alternative embodiments the perception subsystem 110 and/or the application subsystem 115 may contain multiple nodes. These nodes may be arranged in a single layer or may be arranged hierarchically (e.g., in which one layer of perception nodes generates feature vectors which are provided to a next layer of perception nodes).

FIG. 1B is a block diagram illustrating an architecture for a machine learning system 108 that includes multiple perception nodes, in accordance with embodiments of the present disclosure. Machine learning system 108 is similar to machine learning system 105, where machine learning system 108 includes a perception subsystem 111, an application subsystem 116 and an error calculator component 141. However, in contrast to perception subsystem 110, perception subsystem 111 includes multiple perception nodes including perception nodes 114A, 114B, 114C through 114N. The perception nodes 114A-N may be arranged in a single layer or hierarchically in two or more layers.

In embodiments, a data item 112 is input, and each of the perception nodes 114A-N processes information for at least a portion of the data item. For example, the data item 112 may be divided into multiple parts, and each of the perception nodes 114A-N may process one of the multiple parts of the data item 112 to generate a feature vector. Each perception node 114A-N may then generate a sparse feature vector 128A, 128B, 128B through 128N. These sparse feature vectors 128A-N may each be sent from perception subsystem 111 to application subsystem 116. In one embodiment, two or more of the perception nodes 114A-N share a common code book (e.g., have the same set of centroids).

In an example of images, an input image may be divided into multiple image patches (e.g., 4 pixel by 4 pixel image patches), and each perception node 114A-N may receive one of the image patches and produce a sparse feature vector 128A-N based on the contents of a received image patch.

Application node 131 of application subsystem 116 includes a mapping component 136 that maps the multiple feature vectors 128A-N into an output space to determine an output 146. Application node 131 and mapping component 136 may function as described with reference to the similarly named application node 130 and mapping component 135 of FIG. 1A, except that application node 131 receives multiple sparse feature vectors 128A-N as input rather than a single sparse feature vector. In some embodiments (not shown), application subsystem 116 includes multiple application nodes 131, which may be arranged in a single layer or may be arranged hierarchically. Error calculator 141 may generate an error 143 based on a function of a target associated with data item 112 and output 146, and may provide the error to the application subsystem 116 and perception subsystem 111. In one embodiment, error calculator component 141 broadcasts the error 143 to each of the perception nodes 114A-N, and each perception node 114A-N may determine whether it should be updated based at least in part on the error 143.

One objective achieved in some embodiments of this invention is to facilitate a system which offers continuous, or lifelong, learning. In one embodiment, we define lifelong learning as the ability of a system to acquire new representations and mappings of said representations to desired outputs, in an online and gradual manner, without the requirement of having all training information be made available at any one time. Moreover, a change in the statistics of the input data should be detected by the system without the need for external indication of said change. In non-stationary learning settings, whereby the inputs presented to the system are characterized by statistics that change over time, a key challenge is mitigating forgetting of old representations learned as new ones get acquired. This is something that primates, including humans, exhibit as a core skill and has thus far posed a formidable challenge when attempting to achieve using computing machines.

In most supervised learning frameworks, a neural network can be viewed as a large parametric model, where the parameters of the network are its weights. Training said networks involves an iterative process of repeatedly presenting input/target pairs, and adjusting the weights of the network with each such presentation so as to minimize the error associated with the network outputs. However, a key assumption in supervised learning is that the training regime is stationary, which basically means that the statistics of the training set do not change over time. While that's a reasonable assumption to make in many settings in which a large training corpus has been collected, embodiments of the present disclosure pertain to many real-world scenarios in which not all training data is available a priori and thus the system learns progressively.

The philosophical approach conveyed in embodiments of the present disclosure comprises of three main assertions. The first is that in order to support lifelong learning, nodes of the perception subsystem dynamically allocate representational resources (e.g., centroid) in a data-driven manner and upon need. This means that one condition for allocating new representational resources is detection of novelty in the patterns observed, relative to previously observed patterns. However, all practical systems are resource-limited and, consequently, novelty alone may be an inefficient condition for resource allocation. The complementing condition triggering resource allocation is an indication from the application node 130, 131 that resource allocations are merited (referred to herein as relevancy). In one embodiment, when the application node 130, 131 indicates that its current mapping (transformation) of the feature elements produced by the perception node(s) 114 yield relatively high error, this high error condition forms an indication signal to the perception node that it should consider allocating additional representational resources so as to improve the performance of the system as a whole (given that the output of the application node 130 is the system's output).

The third assertion guiding embodiments described herein is that the encoding of representations from the perception node 114(s) to the application node 130, 131 are sparse (e.g., are sparse feature vectors). A sparse feature vector is a feature vector in which the values for most feature elements are zero. In one embodiment, all feature element values except for one feature element value are zero in a sparse feature vector. Specifically, at any given time, only one of the feature elements is nonzero in some embodiments. An underlying principle behind the sparse encoding is to enforce different regions of the sensory input space to correspond to different feature elements in the representations passed to the application node 130, 131. If that is guaranteed, by gradually increasing the number of possible feature elements (e.g. centroids) that can appear in the representations passed to the application, a controlled and progressive characterization of the input space takes place.

As an example illustrating this principle, let us assume that the perception node 114 receives as input various patterns corresponding to the letters "A" and "B". Let us assume that when presented with patterns corresponding to the letter "A", feature elements 1, 2 and 3 get activated (i.e. take on nonzero values). Let us further assume that when presented with patterns corresponding to the letter "B", feature elements 4, 5 and 6 get activated. Correspondingly, the application node 130, which may be trained as a classifier charged with distinguishing between "A" and "B" patterns, learns to map feature vectors with elements 1, 2 and 3 active to class "A" output, and feature vectors with elements 4, 5 and 6 active to class "B" output. Next, let us assume that the perception node 114 is provided with patterns of the letter "C", which it had not received as input prior to that point. The guiding principles followed by some embodiments of this invention would facilitate the allocation of novel feature elements, say 7, 8 and 9, when presented with patterns corresponding to the letter "C". This, in turn, will mean that the classifier (e.g., application subsystem 115, 116) would learn the mapping of feature elements 7, 8 and 9 to class "C". However, in doing so, it will fully retain the mapping of feature elements 1 through 6 to classes "A" and "B", as indicated above, since feature elements with value of zero do not incur changes to weights that they correspond to. In other words, by utilizing sparsity and relying on different underlying patterns yielding mutually exclusive (or strongly non-overlapping) set of active feature elements, the system as a whole mitigates forgetting effects that would otherwise take place, as they do in conventional supervised learning settings.

The perception node(s) 114 is charged with receiving sensory inputs (e.g., data items 112), that may originate from multiple modalities, creating long-term memory that captures regularities in said inputs and exporting to the application node 130, 131 a sparse feature vector(s) 128 extracted from the memory it generates, which facilitates mapping by the application node 130, 131 to a desired output space (e.g., to produce an output 145, 146). Learning at the perception node(s) 114 may occur in a mostly unsupervised (i.e. weakly-supervised) manner such that the machine learning system 105, 108 can continue to learn about the underlying structure of observations even for inputs (data items 112) that do not have corresponding targets or labels. Such semi-supervised learning can be important in many real-world applications, whereby labeled examples are either hard to obtain or costly to collect.

The process governing the learning in the perception node(s) 114 in one embodiment is an online dynamic clustering algorithm, in which a set of centroids, represented as points in the input space, are maintained providing compact (possibly lossy) representation of the sensory inputs observed. Clustering is inherently an unsupervised learning process in that it aims to capture dense regions of samples observed. Embodiments expand on that basic notion to facilitate a semi-supervised learning framework that attempts to both capture regularities in the observations as well as adhere to the demands of the application node 130, 131, which it ultimately serves.

The online aspect of the learning suggests that the generation and adjustments made to said centroids are conducted in an incremental manner, with each new input (data item 112) received, and does not require extensive storing of past inputs and processing of any past inputs. In other words, with each new data item 112 that is input, the online clustering process determines whether any updates to the centroids values should be made.

The dynamic aspect of the clustering process refers to the incremental growing of the centroids set, which may begin with a single centroid and grow to an arbitrary size, in accordance with the nature of the input data that is being processed. The framework additionally allows for pruning (or removal) of centroids, assuming such pruning is deemed necessary or beneficial.

At an initialization stage, a single centroid is established in the perception node(s) 114. The mean (location) of this first centroid can be arbitrarily set. New inputs may be observed, and under the right conditions said inputs will impact one or more of the allocated centroids. In one embodiment, a winner-take-all framework is used for updating centroids and/or for generation of a sparse feature vector 128, in which for every incoming input there is at most one centroid that is the "winning centroid" and is thus selected for inference and potential updating.

In one embodiment, perception node(s) 114 includes a clustering layer 120 and a sparsity layer 125. Alternatively, the sparsity layer 125 may be omitted in some embodiments. Note that the clustering layer 120 and sparsity layer 125 are not shown in perception nodes 120A-N. The input data item 112 may be viewed as a point in a multi-dimensional space. In one embodiment, the clustering layer 120 applies the aforementioned clustering process (e.g., the online dynamic clustering process) to determine values for each feature element or resource based on a distance between a centroid associated with the feature element or resource and the input data item 112. The clustering layer 120 may generate a feature vector that includes values for each of the feature elements and provide the feature vector 122 to the sparsity layer 125. The sparsity layer 125 may then generate the sparse feature vector 128 from the feature vector 122 by selecting one or more feature elements having highest values and then replacing the values of all unselected feature elements with zeros. In one embodiment, a winner-takes-all approach is used, in which only the feature element with the highest value is selected. In another embodiment, n feature elements having highest values are selected, where n is an integer value greater than 1.

In one embodiment, a goal of the perception node(s) 114 is to process each incoming input (data item 112) by associating it with one (or more) of the centroids. Such association can lead to one or more centroids being updated as well as directly impact the content of the representation (e.g., sparse feature vector(s) 128) forwarded to the application node 130, 131. Growing the number of centroids in the perception node(s) 114 is defined by a combination of two considerations. The first is the degree of novelty that the current input and recent past inputs exhibits and the second is the potential relevance a newly allocated centroid would have on the accuracy of the application node 130, 131, as reflected by the error signals or other relevancy signals or scores it produces and has produced in the recent past. In other words, in one embodiment two events need to take place in order for a new centroid to be allocated in a perception node 114: the first is that the current input pattern and recent past input patterns are dissimilar enough to the existing set of centroids and the second is that a relevance measure (e.g., a relevancy rating), which may be derived from one or a sequence of errors and/or confidence values broadcasted by the application node 130, 131, is sufficiently high. In another embodiment, the relevance measure may be used to define a relevancy-weighted metric of novelty. In view of this framework, three disjoint operating regimes can be defined, as shown in FIG. 2.

One possible way to define novelty is to measure the similarity between a given input and each of the existing (previously allocated) centroids and determine whether said similarity is sufficiently low (indicating high novelty of the pattern). Potential similarity measures are the cosine similarity and the inverse Euclidean distance, however any distance or similarity measure may be used. In one embodiment, the distances or similarities are compared to one or more similarity threshold (or distance threshold) to determine whether the new input has sufficiently high or low novelty to satisfy one or more novelty criteria. The threshold (or thresholds) may be an adaptive threshold or a fixed threshold. For adaptive thresholds, the threshold may be determined dynamically based on one or more input parameters. In one embodiment, the threshold for novelty can be determined as the mean distance to the centroid+N standard deviations of the distance, wherein N is an integer value of 1 or greater. The mean and standard deviation can be approximated using moving average estimates, which adapt over time as data comes in.

One possible way to define relevancy is to measure the error associated with the output 145, 146 to determine a relevancy rating. An error calculator 140, 141 may perform an error calculation to produce an error 142, 143, and the error may be provided to the perception node(s) 114 and/or to the application node 130, 131 as a relevancy rating. In one embodiment, the error is linearly or non-linearly proportional to relevancy. Accordingly, a high error means a high relevancy and a low error means a low relevancy. In one embodiment, the error is the relevancy rating.

Each of the perception node(s) 114 and application node 130, 131 may then perform distinct updates based on the error. The provided error 142, 143 may be a simple error based on a difference between output 145, 146 and a target associated with data item 112. Alternatively, the error 142, 143 may be an accumulated error that takes into account a current error as well as errors associated with previous data items 112. Accordingly, the level of relevance (relevancy rating) may be determined by accumulating instantaneous application error values. For example, we can define an accumulated error measure B, and define it as B=B+err(t), where err(t) is the current error for an input data item at time t. Error calculator 140, 141 can check to see if this accumulated error has crossed some threshold to determine whether relevancy is high or low. This is a way to base the decision on relevancy not necessarily on instantaneous errors but rather on sufficient accumulation of errors. In one embodiment, a leaky bucket model is used that accumulates errors associated with multiple data items, but progressively reduces the accumulated error using a reduction factor. For example, we can define the error measure as B=max[0, B*alpha+err(t)], where alpha is a constant between 0 and 1, which would accumulate error but also continuously decrease the accumulated error, which means that now the errors that accumulate should arrive within a certain period of time. One example leaky bucket variation for determining a relevancy rating defines a relative accumulated application error at time n, A(n), as:

$$A(n) = \max\{0, e_{app}(n) - e'_{app}(n)\}$$

where e'(n) denotes a moving average estimate of the mean of the application error at time n.

This particular formulation of accumulated error takes on high values when a sequence of instantaneous application error values are observed while the prior mean application error was relatively low.

Another possible way to define relevancy is based on confidence. In some embodiments, application node 130, 131 generates a confidence value in addition to output 145, 146 or as a part of the output 145, 146. The confidence may indicate an estimate as to a likelihood that the output 145, 146 is a correct output. An input 112 for which the output 145, 146 has low confidence may suggest that the error would be high. The confidence may therefore be used to generate a relevancy rating for the output 145, 146. A confidence may be determined whether or not an input data item 112 is associated with a target. Accordingly, in cases where a target is not provided, the confidence estimate can be used as a relevancy rating. In one embodiment, confidence is approximately inversely proportional to relevancy. Accordingly, a high confidence may indicate a low relevancy while a low confidence may indicate a high relevancy.

The provided confidence (or novelty rating based on confidence) may be a simple confidence determined for a current data item 112. Alternatively, the confidence may be an accumulated confidence measure that takes into account a current confidence value as well as confidence values associated with previous data items 112. In one embodiment, a leaky bucket model is used that accumulates confidences associated with multiple data items, but progressively reduces the accumulated confidence value using a reduction factor.

In one embodiment, the distances or similarities computed for centroids of a given perception node 114 are compared to one or more similarity threshold (or distance threshold) to determine whether the new input has sufficiently high or low novelty to satisfy one or more novelty criteria for the given perception node. The threshold (or thresholds) may be an adaptive threshold or a fixed threshold. For adaptive thresholds, the threshold may be determined dynamically based on one or more input parameters. In one embodiment, the threshold for novelty can be determined as the mean distance to the centroid+N standard deviations of the distance, wherein N is an integer value of 1 or greater. The mean and standard deviation can be approximated using moving average estimates, which adapt over time as data comes in.

In one embodiment, a first similarity threshold is used to determine whether the new input has high or low novelty, and a second similarity threshold is used to determine whether a generated feature vector should be a null feature vector (a feature vector in which all values are zero) rather than a sparse feature vector. If the similarity values for all centroids of a node are below the second similarity threshold, this indicates that the new input is dissimilar from all of the centroids. In such instances, a null feature vector may be generated. The second similarity threshold may have a value, for example, of 0.1, 0.05, 0.01, or some other low value.

FIG. 2 is a block diagram illustrating a node update paradigm 200 for a machine learning architecture, in accordance with embodiments of the present disclosure. The node update paradigm 200 includes the dual criteria of novelty and relevance. Each of the novelty criterion and the relevancy criterion may be associated with its own threshold or set of thresholds, which may be static thresholds or dynamic (variable) thresholds. A high novelty may be determined if the novelty rating associated with a data item exceeds a novelty threshold, and a low novelty may be determined if the novelty associated with the data item is below the novelty threshold. Similarly, a high relevancy may be determined if the relevancy rating associated with the data item exceeds a relevancy threshold, while a low relevancy may be determined for the data item if the relevancy rating for that data item is below the relevancy threshold.

Different operations associated with updating a perception node are determined based on a combination of novelty and relevancy, where novelty is determined by a perception node and relevancy is dictated based on an output of an application node. Each perception node of a perception subsystem may apply the node update paradigm 200 to determine whether that perception node should be updated. In one embodiment, two or more perception nodes share a common code book, where the code book is a set of centroids. In such an embodiment, updates may be made to the shared code book rather than to the individual perception node that uses that code book. Accordingly, updates made by one perception node may be later applied by a second perception node. Additionally, if two nodes use a common code book, then each of those nodes may contribute separate updates to that code book in parallel or in series.

The node update paradigm 200 includes a first regime of pure inference 220 (where centroids are not updated), a second regime of refinement 215, and a third regime of allocation 210. Each perception node in the perception subsystem may make its own individual determination as to which of the three regimes of pure inference 220, allocation 210 and refinement 215 applies for a given data item. The term inference as used herein means the passing of a feature vector from a perception node to an application node.

The first regime (pure inference 220) pertains to the case of high novelty and low relevance. This would suggest that the processed input pattern deviates enough from the existing set of centroids (which have presumably captured dense regions of the input space based on prior inputs received). It would also suggest that the relevance of this novel pattern is low. As a result, no updating of any of the existing centroids should take place. Accordingly, in the pure inference regime 220, a sparse feature vector (inference) is produced (block 240) and no centroids of a perception node are updated (block 230).

In one embodiment, a similarity threshold is used to determine whether the sparse feature vector should be a null feature vector. If every value in the sparse feature vector is below the similarity threshold, then the sparse feature vector may be replaced with a null feature vector. In such an instance, the inference produced at block 240 may be a null feature vector.

The second regime is the refinement regime 215 in which low novelty and low relevance are observed, suggesting that the current input is close enough to one of the centroids and as such should shape that centroid so as to pull it closer to the current input. Accordingly, the winning centroid (centroid that is closest in the multi-dimensional space to the input data item) is updated for the perception node. Additionally, in one embodiment a sparse feature vector (also referred to as an inference vector) is produced at block 240. The sparse feature vector exported to the application node may contain all zeros other than in the index (feature element) corresponding to the winning centroid, for which the similarity to said winning centroid is injected.

The third regime corresponds to the allocation scenario 210, in which the relevance is high and the novelty is high as well. This suggests that the current input is novel and given that the application node carries a high error for the current representation corresponding to this input, allocation of a new centroid should be carried out. Accordingly, in one embodiment a new centroid is allocated (block 235), and the mean of the new centroid takes the value of the current input. A corresponding sparse feature vector may be produced (block 240), which takes into account a new feature element or index associated with the new centroid as well as the preexisting feature elements. In one embodiment, the sparse feature vector has a value of 1 (or an otherwise maximal value) for the new feature element and values of 0 for the other feature elements.

In embodiments, the ability to allocate new centroids to represent new observations in input data items ensures that representations of new types of data/new observations can be generated without distorting representations for previous observations about other data items.

The pure inference regime 220 also applies when high relevance is coupled with low novelty results. As mentioned, in the pure inference regime 220 the node essentially passes the inference with the winning centroid using sparse encoding (e.g., by using a sparse feature vector). In this operational regime no updating of the centroids takes place given that the assumption is that the high error stems from an outlier sample, which is essentially noise rather than a signal carrying sample. Such noise need not impact the centroids. Accordingly, the sparse feature vector is produced at block 240 and no centroids are updated (block 230).

As discussed above, under some operational conditions (e.g., those conditions that trigger the refinement regime 215), the winning centroid of a perception node is to be updated relative to the current input. In the most basic form, updating the centroids can be achieved using the following general formulation:

$$M_i = M_i + \eta(X - M_i)$$

where X denotes the current input as a point in a multi-dimensional space, i is an index for the particular centroid, $M_i$ is a position of the particular centroid in the multi-dimensional space and $\eta$ is a step size. This formulation of the centroid update rule effectively brings the winning centroid slightly closer to the current input.

Updates to the centroid may be modulated by multiple factors, including the error associated with the output (so as to emphasize some samples vs. others). This would result in an update rule of the following form:

$$M_i = M_i + \eta(X - M_i)E(n)$$

where E(n) is a function of the error (also referred to as application error or output error) at time step n.

The above modulation can further be generalized to include any function of the sequence of past errors, such as with an accumulated error measure. For example, E(n) in the above update rule may be substituted with an accumulated error measure B, where B is defined as B=B+E(n). Another variation could be a leaky accumulation, where E(n) in the above update rule may be substituted with an accumulated error measure B, where B is defined as B=B*alpha+E(n), where alpha is a constant between 0 and 1, which would accumulate but leak as well.

In one embodiment, each centroid of a perception node is associated with a plasticity factor. The plasticity factor for a centroid controls how much that centroid is permitted to change based on a given input or set of inputs. In one embodiment, the plasticity factor is initialized with a high value (e.g., a value of 1), and then gradually decays with each update to that centroid. This enables the centroid to be adjusted relatively quickly when the centroid is first allocated, but slowly reduces the ability of that centroid to change. Eventually, a centroid may become essentially fixed, after which the centroid will no longer be updated. This process promotes stabilization of representations pertaining to regularities in the observations.

Two example update rules that employ a plasticity factor have the forms:

$$M_i = M_i + \eta(X - M_i)p_i$$

$$M_i = M_i + \eta(X - M_i)E(n)p_i$$

where $p_i$ is a plasticity factor for the particular centroid, the plasticity factor having a value that is based on a number of times that the particular centroid has been updated.

In one embodiment, the plasticity factor $p_i$ for a centroid is updated with each update according to the formula $p_i = p_i * beta$, where beta is a constant between 0 and 1. In embodiments, each node may have its own set of centroids, and each centroid may have its own plasticity factor. In one embodiment, a plasticity value threshold is used. A plasticity value of a centroid may be compared to the plasticity value threshold (e.g., $10^{-5}$), and if the plasticity value is equal to or less than the plasticity value threshold, then the associated centroid may not be updated any longer.

In some instances, centroids may be allocated which are not later used, or which are only rarely used. For example, new centroids may be allocated as a result of noisy conditions or otherwise transient conditions that did not persist. Such centroids may not be useful. Accordingly, in some embodiments centroids may be removed if one or more centroid removal criteria are satisfied and/or if one or more criteria for retaining centroids (centroid retention criteria) are not satisfied. The ability to remove centroids yields a simpler (in terms of memory and compute footprint) implementation that improves efficiency and reduces use of system resources. Additionally, in some embodiments each node is limited to a finite number of centroids. The ability to remove centroids ensures that the finite number of centroids that are allocated for a node are all useful centroids.

In one embodiment, newly allocated centroids have a probation period during which those centroids will be removed if they fail to satisfy one or more criteria. In one embodiment, should a newly allocated centroid not be selected as the winning centroid more than N times within a period of time T (probation period) following that centroid's allocation for a node, that newly allocated centroid is removed from the node. The values of "N" and "T" define how conservative the system is in removing allocated centroids.

In one embodiment, a centroid retention criterion is based on the plasticity factor associated with that centroid. As discussed above, in some embodiments centroids are associated with plasticity factors, which are reduced after each update. If the plasticity factor associated with a centroid is above a threshold value after the probation period is ended, then that centroid fails to satisfy the centroid retention criterion and is removed from the node.

Figure 3A:
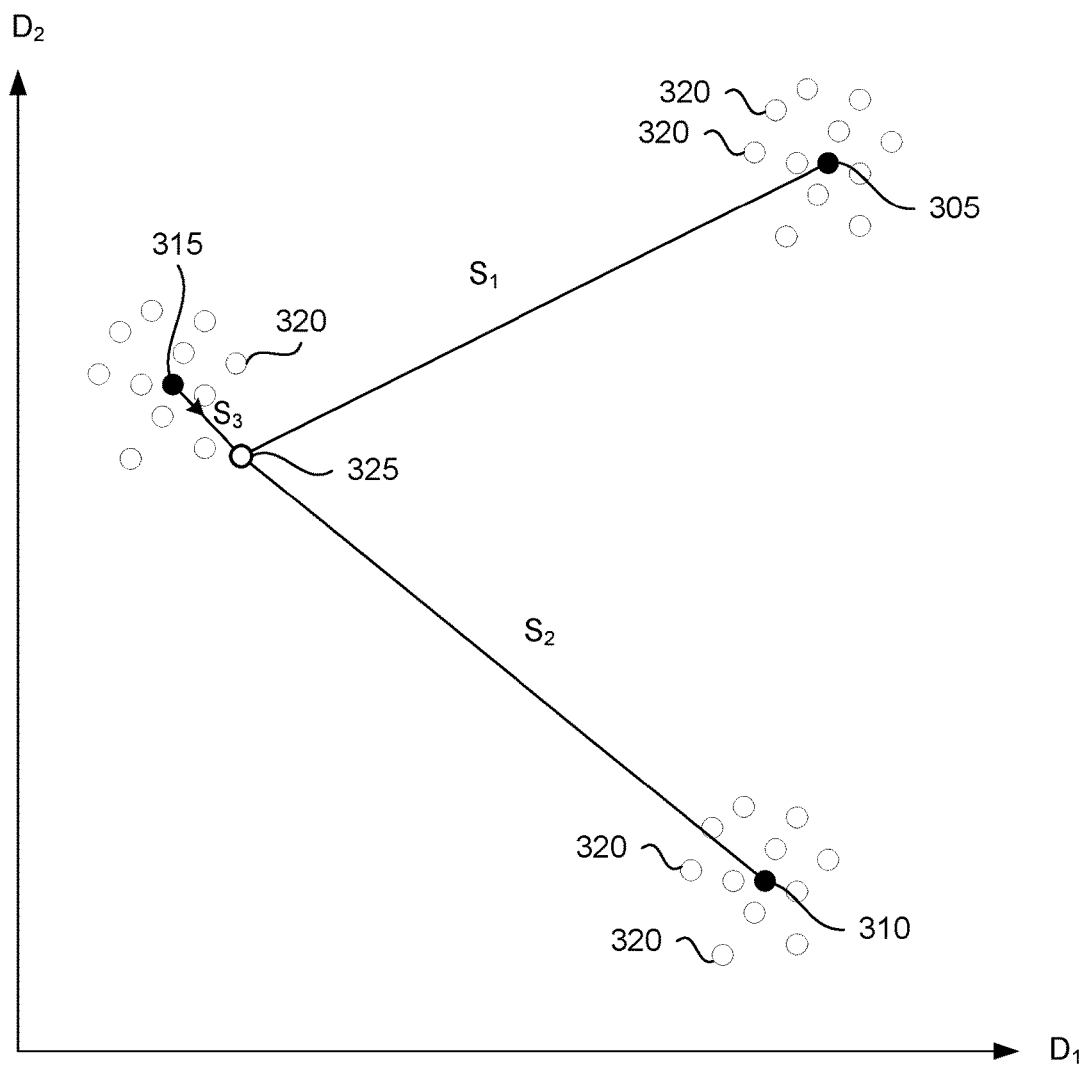
FIG. 3A is a graph illustrating a centroid update process for a node, in accordance with embodiments of the present disclosure.

FIG. 3A is a graph illustrating a centroid update process for a node, in accordance with embodiments of the present disclosure. The centroid update process of FIG. 3A is shown for a degenerate two-dimensional (2D) space including dimension 1 ($D_1$) and dimension 2 ($D_2$). However, in most instances the multi-dimensional space will contain many more dimensions (e.g., tens of dimensions, hundreds of dimensions, thousands of dimensions, etc.). As shown, an example perception node contains three centroids 305, 310 and 315. For illustration, multiple different past data items (represented as points in a 2D space) 320 that have affected the positions of the centroids 305, 310, 315 are also shown.

A new data point 325 (new data item) is input into the perception node, and similarity values are computed for each of the centroids 315, 320, 325. The resulting similarity values are $S_1$ for the similarity to a first centroid 305, $S_2$ for a similarity to a second centroid 310 and $S_3$ for a similarity to a third centroid. The similarity $S_3$ is greatest between the data point 325 and the third centroid 315. Additionally, the similarity $S_3$ satisfies a low novelty criterion (e.g., the similarity is above a similarity threshold or conversely a distance is below a distance threshold) and a determined novelty rating satisfies a low novelty criterion. Accordingly, the third centroid 315 is updated by moving the new centroid in the direction of the data point 325. This may be performed by computing a vector between the third centroid 315 and the data point 325, and then moving the third centroid 315 along the vector. In one embodiment, the third centroid 315 is adjusted according to one of the update rules set forth above.

Figure 3B:
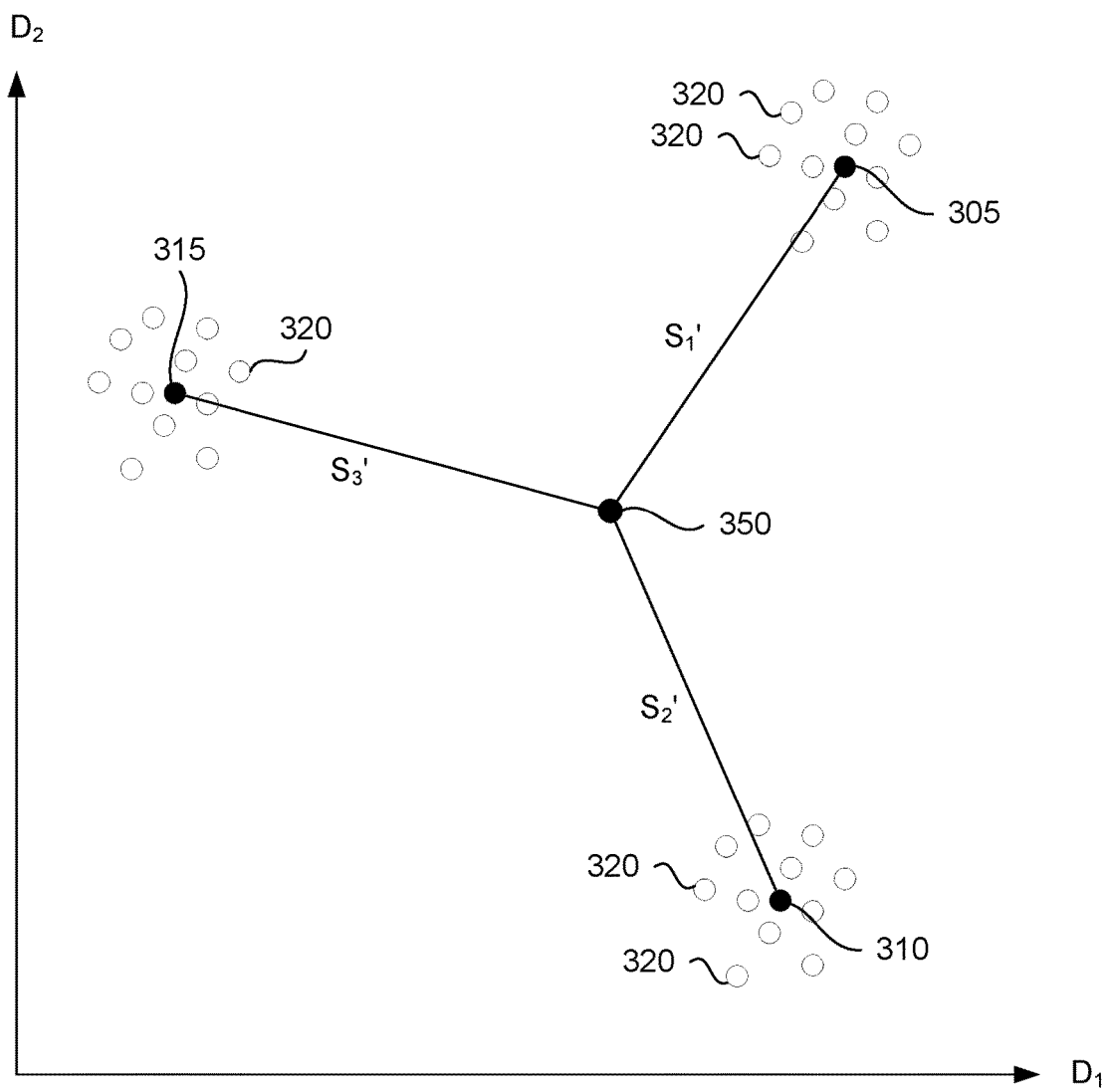
FIG. 3B is a graph illustrating a process to add a new centroid to a node, in accordance with embodiments of the present disclosure.

FIG. 3B is a graph illustrating a process to allocate a new centroid at a node, in accordance with embodiments of the present disclosure. The centroid allocation process of FIG. 3B is shown for a simplified two-dimensional (2D) space including dimension 1 ($D_1$) and dimension 2 ($D_2$). However, in most instances the multi-dimensional space will contain many more dimensions. As shown, an example perception node contains three centroids 305, 310 and 315. For illustration, multiple different past data items (represented as points in a 2D space) 320 that have affected the positions of the centroids 305, 310, 315 are also shown.

A new data point 350 (new data item) is input into the perception node, and similarity values are computed for each of the centroids 315, 320, 325. The resulting similarity values are $S_1'$ for the similarity to a first centroid 305, $S_2'$ for a similarity to a second centroid 310 and $S_3'$ for a similarity to a third centroid. Each of the similarity values is below a similarity threshold, which causes a novelty rating associated with the data point 350 to satisfy a high novelty criterion. Accordingly, a new centroid is allocated at the data point 350. When subsequent data points are input into the perception node, those data points will be compared to the previous centroids 315, 320, 325 as well as to the new centroid at data point 350.

In one embodiment, a perception node sets a refractory period when a new centroid is allocated for that perception node. The refractory period is a period during which the perception node is not permitted to allocate new centroids. The refractory period enables the application node to adjust weights associated with the new centroid to improve its use of the new centroid for generating accurate outputs. The refractory period additionally prevents the perception node from allocating too many new centroids in a short time span. In one embodiment, a refractory value of a perception node is set to 1 when a new centroid is allocated, and the refractory value is decayed geometrically over time until the refractory value is below a threshold. Once the refractory value is below the threshold (e.g., 0.01), the refractory period is over and the perception node may again allocate a new centroid. In one embodiment, the refractory value is decayed based on amount of time passed (e.g., based on processor cycles). In one embodiment, the refractory value is decayed based on number of data items processed, such that the refractory value is updated with each new processed data item. The refractory value may be decayed, for example, by multiplying the refractory value by some fraction (e.g., 0.9999) each cycle.

Referring back to FIGS. 1A-1B, the application node 130, 131 is charged with mapping the sparse feature vector(s) 128 (or dense feature vectors) received from the perception node 114 to the desired output space (e.g., using mapping component 135, 136). The output space may be a classification decision, a prediction signal (or signals), or an action to control or take place in some environment. To that end, the application node 130, 131 remains general and is not confined to a particular problem domain structure.

In one embodiment, the application node 130, 131 comprises a linear function of the feature elements from the sparse feature vector(s) 128 (or dense feature vectors). Alternatively, a non-linear function may be used. Assuming N inputs and M outputs to the application system, the following linear mapping exists between the inputs and the outputs:

$$y_i = \sum_{j=1}^{N} X_j w_{ij} + b_i$$

where index i denotes the output signal (output element) index, index j denotes the input (feature element) signal index and $w_{ij}$ denotes a dedicated weight from input j to output i, $X_j$ denotes a value for a feature element j from a received sparse vector, $y_i$ denotes the value for a particular output element i, and $b_1$ denotes a constant associated with i.

This formulation implies that the mapping created by the application node 130, 131 is piecewise linear with respect to the function that is approximated. Moreover, assuming a sparse encoding of the input signals, only one signal from a given sparse feature vector is nonzero, which when denoted by j yields the simplified expression:

$$y_i = X_j w_{ij} + b_i$$

Let d(i) denote the target value for output i given a specific input to the application node. Furthermore, let's define the error for node i as the difference between the target and the output in one embodiment, such that:

$$e_i = d_i - y_i$$

In one embodiment, we derive the weight update rule for the weight associated with a nonzero feature value and the output for which the target exists using gradient descent. To do so, we minimize the negative gradient (partial derivative) of the squared error with respect to weight $w_{ij}$, such that:

$$w_{ij} = w_{ij} - \eta \frac{\partial e_i^2}{\partial w_{ij}} = w_{ij} + 2\eta e_i X_j$$

The above is a localized learning rule that correlates the error and the input with the weight change. Alternatively, if dense feature vectors are used, then a threshold may be applied, and updates to any weights that are below the threshold may be discarded to achieve a similar result.

The gradient descent used for updating the application node 130, 131 in embodiments is not a deep gradient descent, and does not rely on backpropagation, in contrast to artificial neural networks. Artificial neural networks use deep gradient descent and backpropagation to update every node in the artificial neural network for a given output error.

This results in a heavily entangled state where every feature element of every node contributes to each output decision. In contrast, in embodiments an error (or other novelty rating) is broadcast directly to each node, and each node may determine whether or not to make any updates to its internal representations based on the error or other novelty rating.

In one embodiment, a single-layer linear transformation employed by the application node 130 offers mitigation of forgetting effects and hence supports lifelong learning. If two different underlying patterns received by the perception node(s) 114 yield disjoint (i.e. non-overlapping) representations exported to the application node 130, forgetting is completely avoided given that updates to one class do not impact the other. This is because sparse feature vectors 128 have one or a few non-zero values. Updates to weights in the application node 130 are performed by multiplying values of feature elements by some value associated with the error in embodiments. However, if the value of a feature element is zero, then anything multiplied by that value is also zero, which results in no change to the weight associated with that feature element. Accordingly, only those feature elements with non-zero values are updated.

In one embodiment, a plasticity factor is applied to the weight update mechanism, such that weights that have undergone numerous changes will undergo very small changes in subsequent steps. This is done in order to stabilize the mapping learned so that future inputs don't distort previously learned inputs to output mappings. A possible interpretation of this plasticity modulation takes the form:

$$w_{ij} = w_{ij} - \eta \frac{\partial e_i^2}{\partial w_{ij}} p_{ij} = w_{ij} + 2\eta e_i X_j p_{ij}$$

where $p_{ij}$ is the plasticity term associated with weight $w_{i,j}$.

One possible interpretation of the plasticity term will be to have each $p_{ij}$ be initiated to the value of 1. With each update to weight $w_{ij}$ said plasticity term will be decayed proportionally to the weight update magnitude. This will result in gradual decrease in the plasticity term thus decreasing the weight change magnitude.

As set forth above, the perception node(s) 114 use a first update model and application node 130, 131 uses a second update model. The perception nodes 114 of the perception subsystem 110, 111 and the application node 130, 131 of the application subsystem 115, 116 are co-trained using the above described methodologies. The co-training enables the perception subsystem 110, 111 to learn how best to generate representations that are usable by the application subsystem 115, 116 to generate accurate and meaningful outputs.

Figure 4A:
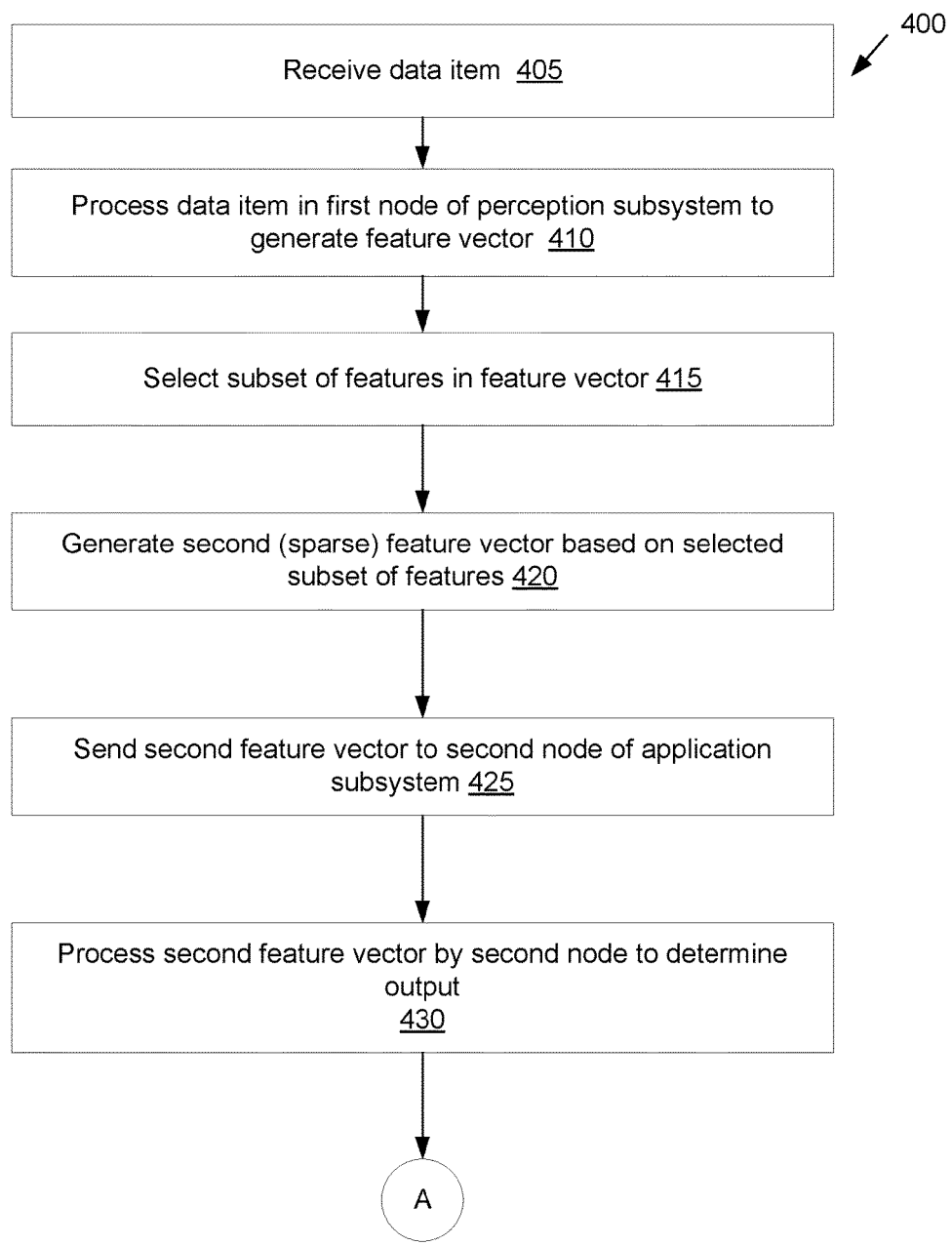
FIGS. 4A-B are flow diagrams illustrating a method for performing lifelong learning in a machine learning system, in accordance with embodiments of the present disclosure.
Figure 4B:
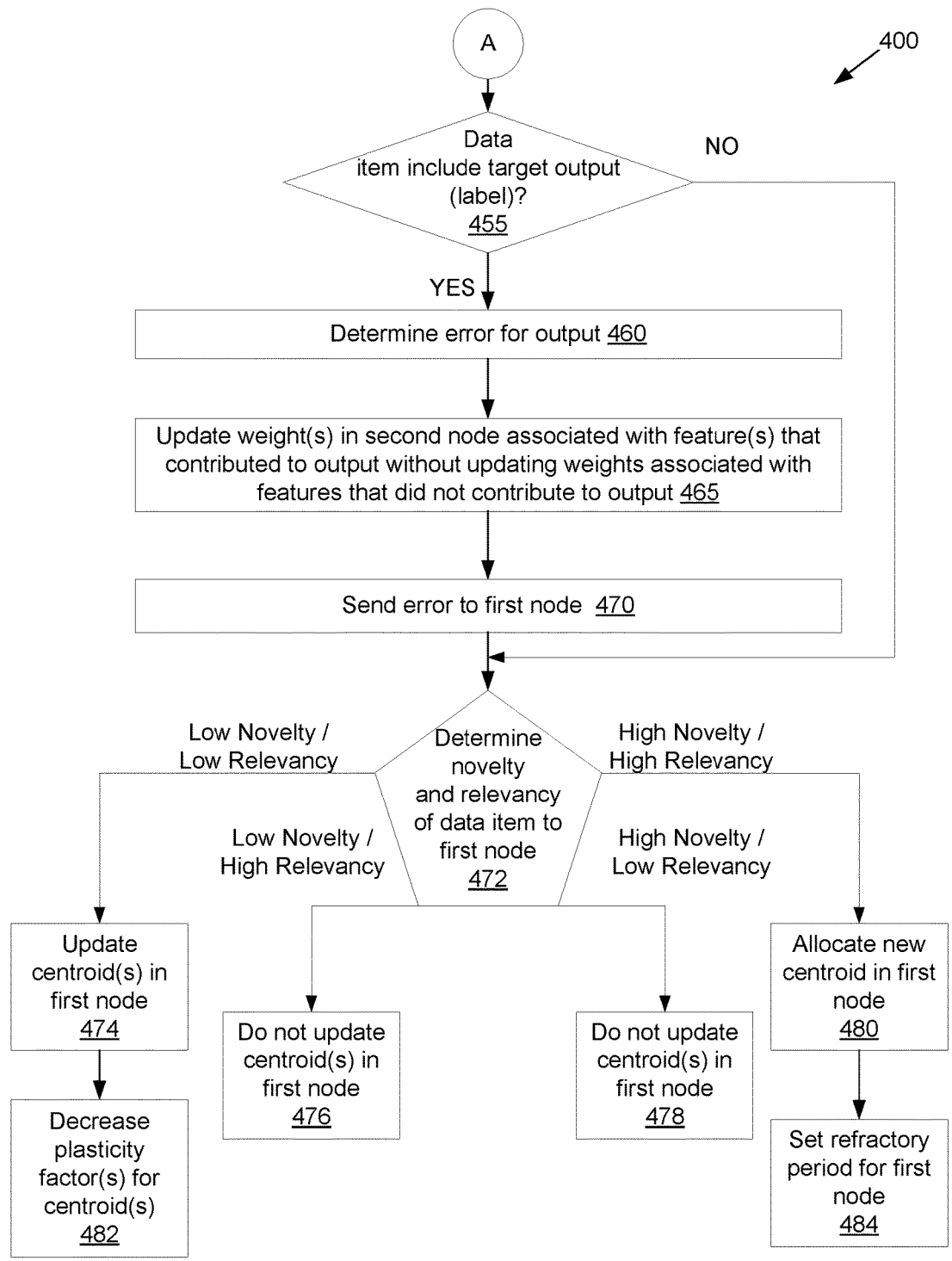

FIGS. 4A-4B are flow diagrams illustrating a method 400 for performing lifelong learning in a machine learning system, in accordance with embodiments of the present disclosure. The method 400 may be performed by processing logic that comprises hardware (e.g., circuitry, dedicated logic, programmable logic, microcode, etc.), software (e.g., instructions run on a processor), firmware, or a combination thereof. The method 400 may be performed, for example, by a computing device such as computing device 500 executing a machine learning system 580 of FIG. 5.

For simplicity of explanation, the method 400 is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

At block 405 of method 400, a machine learning system receives a data item. The machine learning system includes a perception subsystem comprising one or more perception nodes and an application subsystem comprising one or more application nodes, as described herein above. The data item may be any type of data, including an image, an audio file, a text document, software code, a stock quote, weather data, trajectory data, and so on. A nature of the data item may depend on what the machine learning system is being trained to do and/or what the machine learning system has been trained to do. For example, if the machine learning system is trained to classify images, then the data item may be an image. If the machine learning system has been trained to interpret speech, then the data item may be an audio file or audio stream. The data item may be considered a data point in a multi-dimensional space.

At block 410, a first node of the perception subsystem processes the data item (or a portion of the data item or representation of a portion of the data item). The first node may include a set of centroids, and may compare the data item to each of the centroids. The first node may generate a feature vector with a different value associated with a similarity of the data item to or distance of the data item from each of the centroids. For example, if the first node contains three centroids, then a generated feature vector may have a first value associated with a distance from the first centroid, a second value associated with a distance from the second centroid and a third value associated with a distance from a third centroid.

At block 415, the first node selects a subset of feature elements in the feature vector having highest similarity values (or smallest distance values). In one embodiment, a winner-takes-all approach is used, and a single feature element with a highest value is selected. Alternatively, two or more feature elements with highest values are selected.

At block 420, the first node generates a second feature vector based on the selected subset of feature elements by replacing the non-selected values with zeros. Accordingly, the first node generates a sparse feature vector from the original feature vector. In an example, the first feature vector may have the values (0.01, 0.12, 0.87). The feature element with the value of 0.87 may be selected, and a sparse feature vector having the values (0, 0, 0.87) may be generated.

At block 425, the first node sends the second (sparse) feature vector to a second node of the application subsystem. At block 430, the second node processes the second feature vector to determine an output. As discussed herein above, many different types of outputs are possible, depending on what the machine learning system has been trained to do. Some example outputs include a classification of the data item, a prediction based on the data item, or an operation that affects some environment. Examples of operations may include movement commands (e.g., to be made by a robotic system or automated vehicle), words or sentences (e.g., to be output by an internet bot), and so on.

The second node may apply the second feature vector to a linear or non-linear function, as set forth above. The function may be used to determine a score or value for each output element, and may select an output element with a highest score as the output. Alternatively, an output may include a separate value for each output element. In some embodiments, the second node further receives additional sparse feature vectors from one or more other nodes of the perception subsystem, and the multiple sparse feature vectors are all used as inputs into the linear or non-linear function to determine the output.

In embodiments, the machine learning system does not have distinct teaching modes and production modes. Instead, the machine learning system may continually learn while in a production environment using both inputs that include targets (e.g., labeled inputs) and inputs that lack targets (e.g., unlabeled inputs). The perception subsystem and the application subsystem may co-train in a lifelong learning paradigm, where the application subsystem continually learns to improve the accuracy of its outputs and the perception subsystem continually learns to produce representations (feature vectors) that enable the application system to accurately determine outputs.

At block 455, processing logic determines whether the input data item includes a target output (e.g., a label). If the data item includes a target, then an error may be calculated and used to update one or more nodes. If the data item does not include a target, then no error may be calculated. Accordingly, if the data item includes a target, the method continues to block 460. If the data item does not include a target, the method proceeds to block 472.

At block 460, processing logic determines an error for the output generated by the second node of the application subsystem. In one embodiment, the error is computed based on a difference between the target output and the generated output. In a further embodiment, the error is computed as an accumulation of errors across multiple data items. The accumulation may be an accumulated error within a moving window, for example. In a further embodiment, the error is computed as an accumulation of errors that is adjusted by a decay factor. The decay factor may reduce a current accumulation of errors at every interval (e.g., with every time increment or every new data item), for example. A few examples of error calculations are provided above with reference to FIGS. 1A-B.

At block 465, processing logic updates weights in the second node associated with a feature element or feature elements that contributed to the output. The weights associated with feature elements that contributed to the output are updated without updating the weights associated with additional feature elements that did not contribute to the output. Those feature elements that did not contribute to the update have zero values. Accordingly, if a simple gradient descent update mechanism is used to update the weights of the second node, update values for each of the feature elements with zero values are multiplied by zero, resulting in no changes being made to the associated weights. Accordingly, the use of sparse feature vectors enables updates to weights of feature elements that are relevant to a particular output without updating weights of feature elements that are not relevant to that particular output. This prevents the second node from forgetting how to accurately produce other outputs while training the second node to accurately produce a first output. Some examples of update mechanisms for the second node have been discussed above with reference to FIGS. 1A-B.

At block 470, processing logic sends the error to the first node of the perception subsystem. In the case where there are multiple nodes in the perception subsystem, processing logic may broadcast the error to each of the perception nodes. Each perception node may then make its own determination as to whether any centroids of that node should be updated. Note that the error is not back propagated through any intermediate layers of nodes to get to the perception nodes in embodiments. Instead, the error may be sent directly to each perception node in some embodiments. This may reduce or prevent entanglement between nodes with regards to their contribution to particular outputs.

At block 472, processing logic determines a relevancy rating as well as a novelty rating for the data item with regards to the first node. The novelty and relevancy rating may also be determined with regards to other perception nodes if other perception nodes are present. Accordingly, the operations of block 472 may be performed independently for each perception node. Processing logic then determines whether the relevancy rating satisfies one or more relevancy criteria and determines whether the novelty rating satisfies one or more novelty criteria separately for each perception node. The relevancy criteria may include a first relevancy criterion for high relevancy and a second relevancy criterion for low relevancy. Similarly, the novelty criteria may include a first novelty criterion for high novelty and a second novelty criterion for low novelty. In one embodiment, the relevancy rating is determined globally for a data item such that the same relevancy rating is used for each perception node. In one embodiment, the novelty rating is computed separately for each perception node.

In one embodiment, the relevancy rating is based on a computed error. For example, the relevancy rating may be based on direct error, on accumulated error, or on some other function of error. In some embodiments, a relevancy rating may be computed even in the absence of an error value (e.g., in the absence of a target associated with the data item). In one embodiment, the output determined at block 430 includes or is accompanied by a determined confidence score. The second node may be trained to generate a confidence score for each output that it generates. The confidence score may indicate a confidence that the output is a correct output. If the data item did not include a target, and thus no error was computed, then the confidence score may be used as the relevancy rating or to determine the relevancy rating. For example, a high error may be correlated with a low confidence, and a low error may be correlated with a high confidence. Accordingly, a high error and/or a low confidence may result in a high relevancy, and a low error and/or a high confidence may result in a low relevancy.

In one embodiment, one or more relevancy thresholds are used to determine whether the relevancy rating is representative of a high relevancy or a low relevancy. The relevancy threshold (or thresholds) may be static thresholds or dynamic thresholds, as discussed in greater detail above. If the relevancy rating meets or exceeds a relevancy threshold, then a high relevancy may be determined. If the relevancy rating is below a relevancy threshold, then a low relevancy may be determined.

As mentioned, a relevancy rating may be determined for a data item, and the same relevancy rating may be used by multiple different perception nodes (in the use case that more than one perception node is present in the perception subsystem). In contrast, each perception node may determine its own novelty rating for the data item. In one embodiment, the novelty rating for a perception node is determined based on comparing the data item to each centroid in the perception node and computing distances between the centroids and the data item in a multi-dimensional space. Novelty may be determined based on one or more shortest distances (or highest similarities) that are computed between the data item and a centroid. The novelty criteria may include a distance threshold (or similarity threshold). The one or more shortest distances may be compared to the distance threshold (or similarity threshold), and the data item may be determined to have high novelty if the one or more shortest distances exceed or meet the distance threshold (or are equal to or less than the similarity threshold), and may be determined to have low novelty if the one or more distances are below the distance threshold (or are above the similarity threshold). The distance threshold (or similarity threshold) may be a static threshold or a dynamic threshold. Additionally, the distance threshold may be different for each node and/or for each centroid. In one embodiment, the distance threshold associated with a centroid is based on a standard deviation associated with that centroid (e.g., based on the data items that have been used to update that centroid).

If at block 472 it is determined that a data item has low novelty and low relevancy, the method continues to block 474. If it is determined that the data item has low novelty and high relevancy, the method continues to block 476. If it is determined that the data item has high novelty and low relevancy, the method continues to block 478. If it is determined that the data item has high novelty and high relevancy, the method continues to block 480.

At block 474, processing logic updates one or more centroids of the first node. In one embodiment, a single centroid is updated by moving that single centroid towards the data item in the multi-dimensional space. The updated centroid may be a centroid associated with a feature element in the feature vector having a highest similarity value. In one embodiment, the centroid is updated using an online clustering process, as described above. Alternatively, two or more centroids that are closest to the data item in the multi-dimensional space may be updated. Remaining centroids of the first node may not be updated during the update process. In one embodiment, the updated centroid is associated with a plasticity factor that affects the magnitude of changes to the centroid. At block 482, the plasticity factor for the centroid is decreased. In one embodiment, the plasticity factor is compared to a plasticity factor threshold prior to updating the centroid at block 474. If the plasticity factor is below the plasticity facture threshold, then no update is made to the centroid in one embodiment.

At block 476, no centroids in the first node are updated.
At block 478, no centroids in the first node are updated.
At block 480, processing logic allocates a new centroid for the first node. The new centroid may have a position in a multi-dimensional space that is equal to the data item in the multi-dimensional space. In one embodiment, at block 484 processing logic sets a refractory period for the first node. No new centroids may be added to the first node during the refractory period.

As set forth above in method 400, different techniques are used for updating the second (application) node and the first (perception node) and different criteria are used to determine when perception nodes are to be updated and when application nodes are to be updated. By applying these different techniques and criteria, the perception subsystem and application subsystem may be co-trained in a manner that results in lifelong learning, localized learning and high sample efficiency. Additionally, the machine learning system is trained continuously with both data items that include targets and data items that do not include targets. Accordingly, the machine learning system achieves semi-supervised learning.

Figure 5:
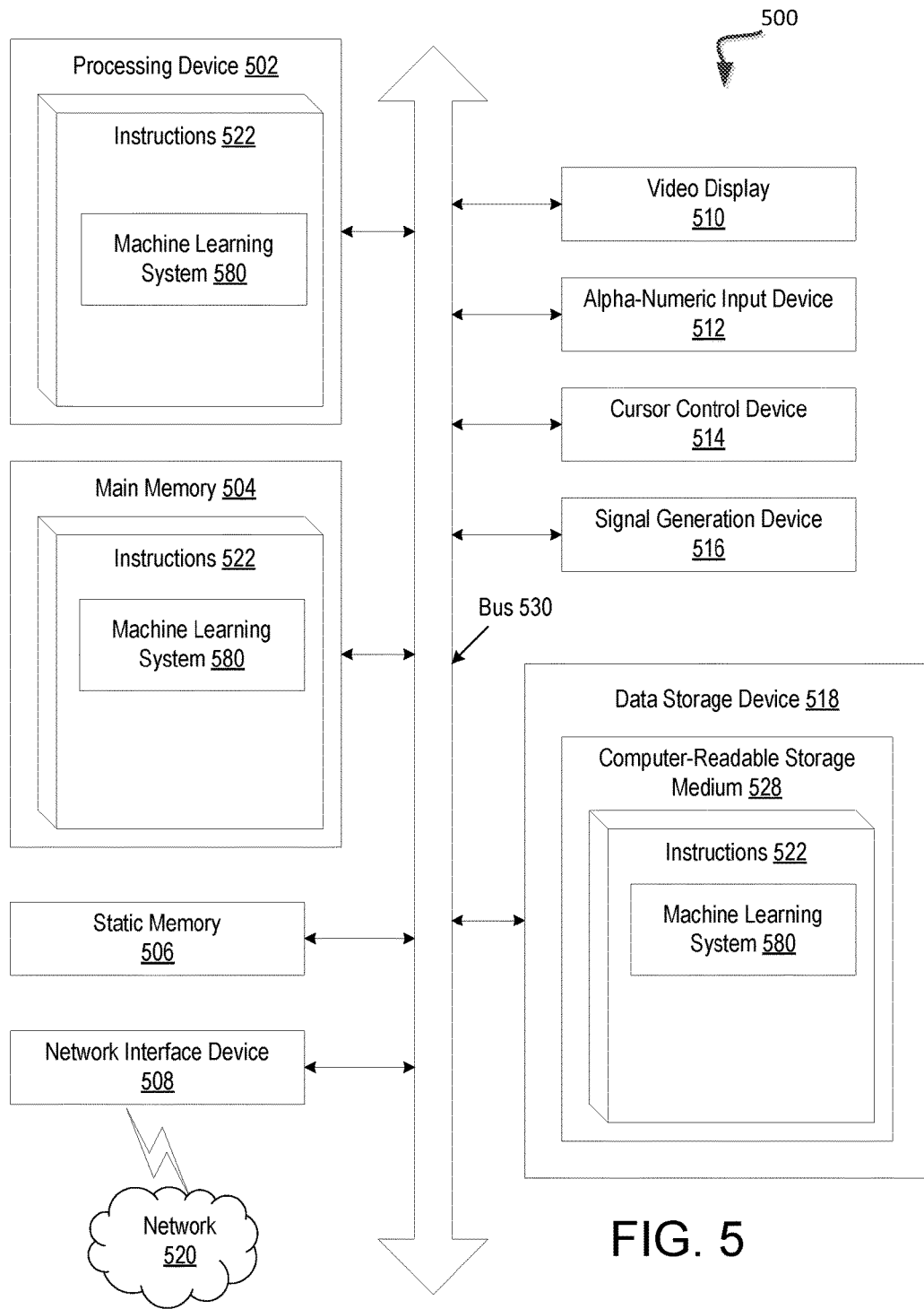
FIG. 5 is a block diagram illustrating an exemplary computer system, in accordance with embodiments of the present disclosure.

FIG. 5 illustrates a diagrammatic representation of a machine in the exemplary form of a computing device 500 within which a set of instructions, for causing the machine to perform any one or more of the methodologies discussed herein, may be executed. The computing device 500 may be in the form of a computing device within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing device 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions 522 (e.g., instructions of machine learning system 580) embodying any one or more of the methodologies or functions described herein. Machine learning system 580 may correspond to machine learning system 105 of FIG. 1A and/or machine learning system 106 of FIG. 1B in embodiments. The instructions 522 may also reside, completely or at least partially, within the main memory 504 and/or the processing device 502 during execution thereof by the computer system 500, the main memory 504 and the processing device 502 also constituting computer-readable media.

While the computer-readable storage medium 528 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies described herein. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring embodiments of the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "processing", "receiving", "updating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for a machine learning system that mitigates catastrophic forgetting, comprising:
   receiving a data item;
   processing, by a first node that comprises a plurality of centroids, information from at least a portion of the data item to generate a first feature vector, wherein the first feature vector comprises a plurality of feature elements, each of the plurality of feature elements having a similarity value representing a similarity to one of the plurality of centroids;
   selecting a subset of the plurality of feature elements from the first feature vector, the subset containing one or more feature elements of the plurality of feature elements that have highest similarity values;
   generating a second feature vector from the first feature vector by replacing similarity values of feature elements in the first feature vector that are not in the subset with zeros;
   processing the second feature vector by a second node to determine an output;
   determining, by the first node, a novelty rating for the data item based on similarity values of the plurality of feature elements in at least one of the first feature vector or the second feature vector;
   determining a relevancy rating for the data item; and
   determining whether to update the first node based on the novelty rating and the relevancy rating.

2. The method of claim 1, wherein the output is selected from a group consisting of a classification of the data item, a prediction of a future state, and an action to be applied to an environment.

3. The method of claim 1, wherein the data item comprises a target, the method further comprising:
   determining an error based on a difference between the output and the target, wherein the relevancy rating is based at least in part on the error; and
   updating the second node based on the error.

4. The method of claim 1, wherein updating the second node comprises updating weights associated with feature elements in the second feature vector that have non-zero values without updating weights associated with a remainder of feature elements in the second feature vector.

5. The method of claim 4, wherein an amount that a weight associated with a particular feature element is updated is based at least in part on a plasticity factor associated with the particular feature element, the method further comprising:
   decreasing the plasticity factor associated with the particular feature element after adjusting the weight associated with the particular feature element.

6. The method of claim 1, wherein the second feature vector is input into a linear function of the second node, wherein the linear function is:

$$y_i = \sum_{j=1}^{N} X_j w_{ij} + b_i$$

where i denotes an output signal index, $y_i$ denotes a possible output value associated with i for the output, N denotes a number of feature elements in the second feature vector, j denotes an input signal index, $X_j$ denotes a value of an input associated with j, $w_{ij}$ denotes a weight from the input associated with j to the output associated with i, and $b_i$ denotes a constant associated with i, and wherein the output is the output value $y_i$ having a highest value.

7. The method of claim 6, wherein $w_{ij}$ is updated based on the function:

$$w_{ij}=w_{ij}+\eta e_i X_j p_{ij}$$

where $\eta$ is a step size, $e_i$ is an error associated with i and $p_{ij}$ is a plasticity factor associated with $w_{ij}$, the method further comprising:
decreasing a value of the plasticity factor $p_{ij}$ responsive to adjusting $w_{ij}$.

8. The method of claim 1, further comprising:
determining that the novelty rating exceeds a novelty threshold and that the relevancy rating is below a relevancy threshold; and
determining that no update to the first node is to be made.

9. The method of claim 1, further comprising:
determining that the novelty rating is below a novelty threshold and that the relevancy rating is below a relevancy threshold;
determining updates for a subset of the plurality of centroids that are associated with the subset of the plurality of feature elements; and
updating the subset of the plurality of centroids without updating other centroids of the plurality of centroids.

10. The method of claim 9, wherein the data item does not include a target.

11. The method of claim 9, wherein the information from at least the portion of the data item comprises a point in a multi-dimensional space, and wherein updating a centroid comprises moving the centroid towards the point in the multi-dimensional space.

12. The method of claim 11, wherein determining a distance to move a particular centroid comprises applying a centroid update rule of:

$$M_i=M_i+\eta(X-M_i)p_i$$

where i is an index for the particular centroid, $M_i$ is a position of the particular centroid in the multi-dimensional space, $\eta$ is a step size, X is the point in the multi-dimensional space, and $p_i$ is a plasticity factor for the particular centroid, the plasticity factor having a value that is based on a number of times that the particular centroid has been updated.

13. The method of claim 12, further comprising:
reducing the value of the plasticity factor for the particular centroid after updating the particular centroid.

14. The method of claim 1, further comprising:
determining that the novelty rating is above a novelty threshold and that the relevancy rating is above a relevancy threshold; and
allocating a new centroid for the first node.

15. The method of claim 14, further comprising:
initiating a refractory period for the first node, wherein no new centroids can be allocated for the first node during the refractory period.

16. The method of claim 1, further comprising:
determining that the novelty rating is below a novelty threshold and that the relevancy rating exceeds a relevancy threshold; and
determining that no update to the first node is to be made.

17. The method of claim 1, wherein the first node is a component of a perception subsystem of the machine learning system and wherein the second node is a component of an application subsystem of the machine learning system, the method further comprising:
generating additional feature vectors by one or more additional nodes in the perception subsystem; and
processing the second feature vector and the additional feature vectors by the second node to determine the output, wherein the output is based on a combination of the second feature vector and the additional feature vectors.

18. The method of claim 17, further comprising:
co-training the perception subsystem and the application subsystem based on labeled data items and unlabeled data items, wherein a first function is used to train nodes in the perception subsystem and a second function is used to train nodes in the application subsystem.

19. A system comprising:
at least one memory to store instructions for a machine learning system that mitigates catastrophic forgetting; and
at least one processing device, operatively coupled to the at least one memory, to execute the instructions, wherein the instructions cause the processing device to:
receive a data item;
process, by a first node that comprises a plurality of centroids, information from at least a portion of the data item to generate a first feature vector, wherein the first feature vector comprises a plurality of feature elements, each of the plurality of feature elements having a similarity value representing a similarity to one of the plurality of centroids;
select a subset of the plurality of feature elements from the first feature vector, the subset containing one or more feature elements of the plurality of feature elements that have highest similarity values;
generate a second feature vector from the first feature vector by replacing similarity values of feature elements in the first feature vector that are not in the subset with zeros;
process the second feature vector by a second node to determine an output;
determine, by the first node, a novelty rating for the data item based on similarity values of the plurality of feature elements in at least one of the first feature vector or the second feature vector;
determine a relevancy rating for the data item; and
determine whether to update the first node based on the novelty rating and the relevancy rating.

20. The system of claim 19, wherein the data item comprises a target, and wherein the instructions further cause the processing device to:
determine an error based on a difference between the output and the target, wherein the relevancy rating is based at least in part on the error; and
update the second node based on the error.

21. The system of claim 19, wherein updating the second node comprises updating weights associated with feature elements in the second feature vector that have non-zero values without updating weights associated with a remainder of feature elements in the second feature vector, wherein an amount that a weight associated with a particular feature element is updated is based at least in part on a plasticity factor associated with the particular feature element, and wherein the instructions further cause the processing device to:

decrease the plasticity factor associated with the particular feature element after adjusting the weight associated with the particular feature element.

22. The system of claim 19, wherein the instructions further cause the processing device to:

determine that the novelty rating is below a novelty threshold and that the relevancy rating is below a relevancy threshold;

determine updates for a subset of the plurality of centroids that are associated with the subset of the plurality of feature elements; and update the subset of the plurality of centroids without updating other centroids of the plurality of centroids.

23. The system of claim 19, wherein the instructions further cause the processing device to:

determine that the novelty rating is above a novelty threshold and that the relevancy rating is above a relevancy threshold; and allocate a new centroid for the first node.

24. The system of claim 23, wherein the instructions further cause the processing device to:

determine after a time period that the new centroid fails to satisfy a centroid retention criterion; and remove the new centroid from the first node.

\* \* \* \* \*